(12) United States Patent
Dolganow et al.

(10) Patent No.: US 7,953,017 B2
(45) Date of Patent: *May 31, 2011

(54) APPLICATION SPECIFIC SERVICE PING PACKET

(75) Inventors: Andrew Dolganow, Kanata (CA);
Steven Edward Morin, Ottawa (CA);
Anthony Peres, Ottawa (CA)

(73) Assignee: Alcatel-Lucent, Paris (FR)

( * ) Notice: Subject to any disclaimer, the term of this patent is extended or adjusted under 35 U.S.C. 154(b) by 280 days.

This patent is subject to a terminal disclaimer.

(21) Appl. No.: 12/073,108

(22) Filed: Feb. 29, 2008

(65) Prior Publication Data
US 2009/0219813 A1 Sep. 3, 2009

(51) Int. Cl.
*H04J 3/14* (2006.01)
(52) U.S. Cl. .................................. 370/249; 709/224
(58) Field of Classification Search ............. 370/229, 370/231, 235, 241.1, 249, 252, 253, 395.21, 370/395.3; 709/224
See application file for complete search history.

(56) References Cited

U.S. PATENT DOCUMENTS

2005/0163047 A1 * 7/2005 McGregor et al. ............ 370/229
2009/0086651 A1 * 4/2009 Luft et al. ..................... 370/253

* cited by examiner

*Primary Examiner* — Seema S Rao
*Assistant Examiner* — Leon Andrews
(74) *Attorney, Agent, or Firm* — Kramer & Amado P.C.

(57) ABSTRACT

Various exemplary embodiments relate to a method and related network node including one or more of the following: creating the application specific service ping packing including a special packet identification field that identifies the application specific service ping packet as a special packet, and including an application identification field that identifies an application to which the application specific service ping packet corresponds; modifying a deep packet inspection engine to recognize the application specific service ping packet; sending the application specific service ping packet through a deep packet inspection element; identifying the application specific service ping packet as a special packet; determining that the application specific service ping packet can be mapped to a specific application; identifying the specific application; setting an application for processing to the specific application; and performing known application processing based on the set specific application.

16 Claims, 3 Drawing Sheets

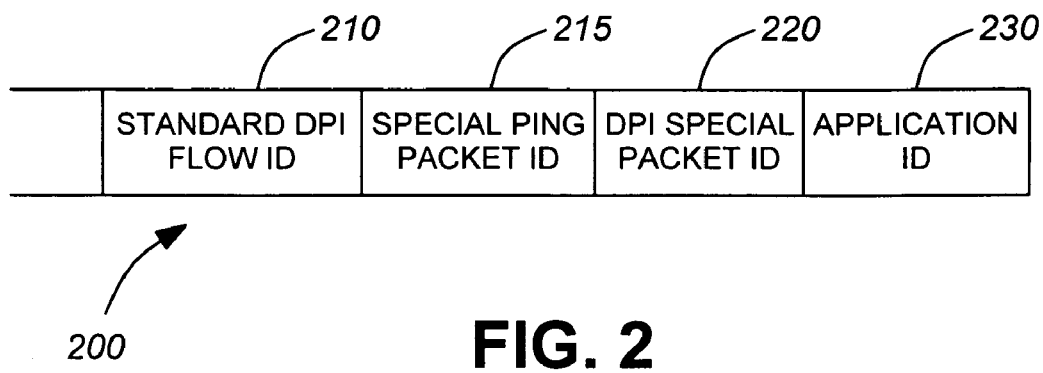
FIG. 2
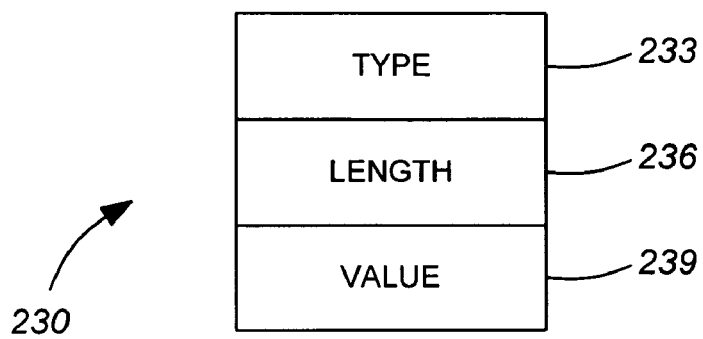
FIG. 3
FIG. 4

APPLICATION SPECIFIC SERVICE PING PACKET

BACKGROUND OF THE INVENTION

1. Field of the Invention

This invention relates generally to packet based communications using deep packet inspection (DPI).

2. Description of Related Art

In its existing form, DPI is a sort of computer network packet processing that examines data and/or header part of a packet as it passes an inspection point, searching for non-protocol compliance, viruses, spam, intrusions or predefined criteria defining a protocol or application to decide what if any content specific processing needs to be performed. DPI is also sometimes called Content Inspection or Content Processing. DPI is in contrast to shallow packet inspection (usually called just packet inspection) which just checks the lower-layer header portion of a packet (usually up to Layer 3 of the OSI model).

DPI devices have the ability to look at Layer 2 through Layer 7 of the OSI model. This includes headers and data protocol structures as well as the actual payload of the message. The DPI will identify and classify the traffic based on a signature database and the information extracted from the packet, allowing finer control than classification based only on header information.

A classified packet can be, among others, redirected, marked/tagged (see QoS), blocked, rate limited, and of course reported to a reporting agent in the network. DPI devices first identify packet DPI flows (for example defined by IP 5-tuple) and then perform DPI on packets within each flow, allowing identification and control actions based on accumulated single or multiple flow information.

DPI allows phone and cable companies to readily know the type of applications a user is receiving online, from e-mail, to websites, to sharing of music, video and software downloads as would a network analysis tool. This is the approach that cable operators and ISPs may use, for example, to dynamically allocate bandwidth resources to match requirements of a particular application that is passing through their networks. Thus, for example, a low-latency resources can be allocated to a VoIP call versus web browsing.

DPI is also increasingly being used in security devices to analyze flows, compare them against policy, and then treat the traffic appropriately (i.e., block, allow, rate limit, tag for priority, mirror to another device for more analysis or reporting). Since the DPI device looks at each individual packet, it can be used by ISPs to provide or block services on a user by user basis.

Unfortunately, in its existing form, DPI is not able to operate in a manner that can identify an application from a single packet as multiple packets, often in both directions, or even multiple flows may need to be examined to avoid false-positive identification. Thus, there is a need for a DPI system and method that enable the identification of an application from a single packet, such as a ping packet.

The foregoing objects and advantages of the invention are illustrative of those that can be achieved by the various exemplary embodiments and are not intended to be exhaustive or limiting of the possible advantages which can be realized. Thus, these and other objects and advantages of the various exemplary embodiments will be apparent from the description herein or can be learned from practicing the various exemplary embodiments, both as embodied herein or as modified in view of any variation that may be apparent to those skilled in the art. Accordingly, the present invention resides in the novel methods, arrangements, combinations, and improvements herein shown and described in various exemplary embodiments.

SUMMARY OF THE INVENTION

In light of the present need for an application specific service ping packet, a brief summary of various exemplary embodiments is presented. Some simplifications and omissions may be made in the following summary, which is intended to highlight and introduce some aspects of the various exemplary embodiments, but not to limit the scope of the invention. Detailed descriptions of a preferred exemplary embodiment adequate to allow those of ordinary skill in the art to make and use the inventive concepts will follow in later sections.

Existing Service Ping (SVC-PING) packets lack the ability to provide an application specific indication and associated parameters as an application cannot be determined from a single packet unrelated in any form to that application. SVC ping when injected will traverse the path packets for the service would take but cannot traverse paths applications within that service take if they are distinct.

Various exemplary embodiments of SVC-PING are an extension of the IETF VCCV-PING standard, similar to the ICMP-PING and LSP-PING tools. These are used to detect the connection state of a pseudo-wire manually but again lack application-awareness capabilities.

To solve the problems described herein, various exemplary embodiments include a new type of service ping packet. This is referred to herein as an application specific service ping packet.

A packet of this type includes an indication of the application which is being tested, or simulated, by the packet. This allows DPI equipment to quickly determine the application in question from only one packet and allows the packet to traverse a path specific to the given application. Any associated application parameters can also be included in the packet as well as a loopback indication if the packet is to be looped back to its source when it reaches its destination.

BRIEF DESCRIPTION OF THE DRAWINGS

In order to better understand various exemplary embodiments, reference is made to the accompanying drawings, wherein:

FIG. 2 is a fragmented schematic diagram of an exemplary application specific service ping packet;

FIG. 3 is a schematic diagram of an exemplary application identification field for an application specific service ping packet;

FIG. 4 is a fragmented schematic diagram of an exemplary application mapping table for use with a system and method for an application specific service ping packet.

DETAILED DESCRIPTION OF THE PREFERRED EMBODIMENTS OF THE INVENTION

Figure 1:
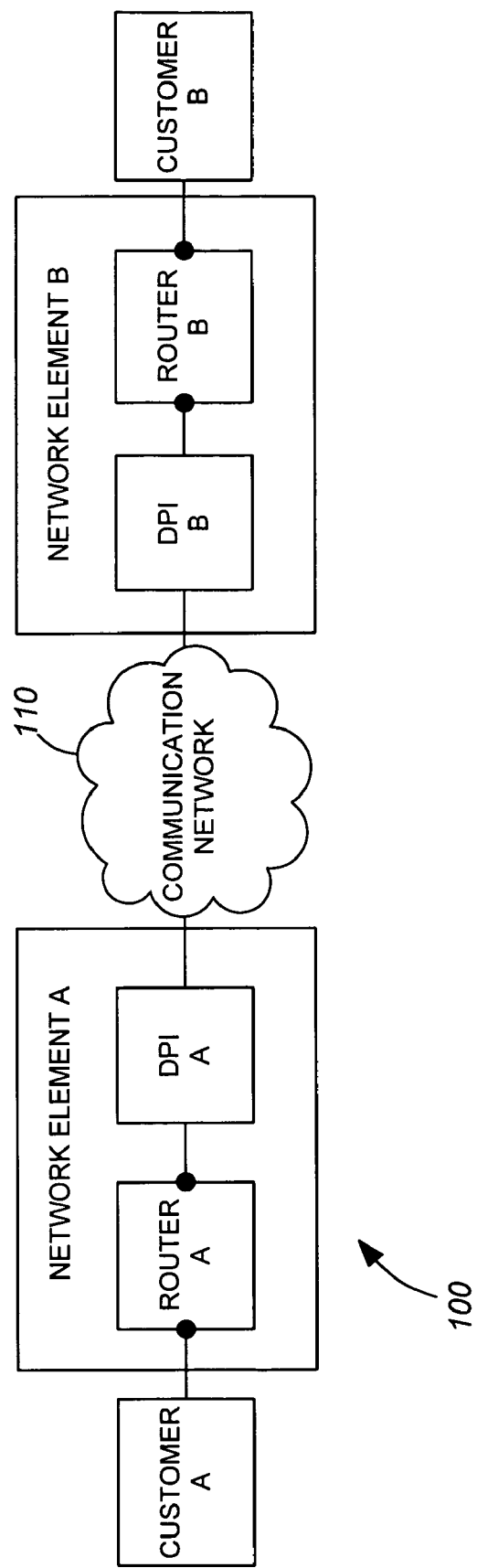
FIG. 1 is a schematic diagram of an exemplary system for an application specific service ping packet.

Referring now to the drawings, in which like numerals refer to like components or steps, there are disclosed broad aspects of various exemplary embodiments.

FIG. 1 is a schematic diagram of an exemplary system 100 for an application specific service ping packet. Communications in system 100 travel between customer A and customer B through network element A, communication network 110, and network element B.

Network element A includes a router A and a DPI A. Likewise, network element B includes a router B and a DPI B. However, it should be noted that, in various exemplary embodiments network element A itself is a DPI. Likewise, in various exemplary embodiments, network element B is itself a DPI.

In other words, network element A can take any possible form as long as it has or is a DPI. The same is true of network element B. Likewise, network element A and network element B have application processing such as QoS, policing, remarking of a packet, and so on, and DSCP that affects the path the packet traverses in the communications network 110.

It should also be noted that the invention described herein will function in a system 100 containing any number of DPIs greater than one. In exemplary system 100, only two DPIs are shown for simplicity. They are DPI A and DPI B. The invention will now be described in greater detail in connection with FIGS. 2-5.

FIG. 2 is a fragmented schematic diagram of an exemplary application specific service ping packet 200. Exemplary ping packet 200 includes a standard DPI flow ID 210, special ping packet ID 215, a DPI special packet ID 220, and an application ID 230. In some embodiments DPI special packet ID 220 may not be required and a combination of special ping packet ID 215 and application ID 230 may suffice.

The DPI special packet ID 220 and application ID 230 are portions of the ping packet 200 not previously included in other known forms of ping packets. The standard DPI flow ID 210 represents information normally required by a DPI to identify a particular flow. The content in exemplary packet 200 preceding the standard DPI flow ID 210 is omitted in FIG. 2 for simplicity. This is represented by the fragmented portion of FIG. 2.

The DPI special packet ID 220 sits behind the standard DPI flow ID 210 and special ping packet ID 215 in exemplary application specific service ping packet 200. The DPI special packet ID 220 represents information in exemplary application specific service ping packet 200 that enables the DPI, such as DPI A or DPI B, to recognize that the application specific service ping packet 200 is a special kind of DPI packet that is to be processed by this specific or any DPI element. In some embodiments identification of the DPI to process the packet may not be part of the DPI special packet ID but instead part of any other fields in the packet like Standard DPI Flow ID 210 or Application ID 230 or Special Ping Packet ID 215. This information can be implemented according to any currently known, or later developed technique known in the art.

The application ID 230 represents application specific data that classifies the packet as if it belonged to a pre-determined application. However, because of the DPI special-packet ID 220 or special ping packet ID 215 (when special packet ID 220 is not required), the exemplary application specific service ping packet 200 is able to associate the identified application to the DPI using only a single packet. This represents a significant improvement over previously known techniques for identifying an application because all such techniques require the inspection of a plurality of packets before an associated application can be identified.

FIG. 3 is a schematic diagram of an exemplary application identification field 230 for an application specific service ping packet 200. Exemplary application identification field 230 includes a type field 233, a length field 236 and a value field 239.

In various exemplary embodiments, the type field 233 is used to identify a type of application to which the identified application belongs. In various exemplary embodiments the length field 236 identifies an associated length.

In various exemplary embodiments the value field 239 contains a value for information associated with the application identified by exemplary application ID field 230. Examples of the content of the value field 239 include an application code point and an application data point. In various exemplary embodiments, the application ID field 230 carries more than one type length value (TLV) fields. Accordingly, in various exemplary embodiments, the application ID field 230 includes nested TLV fields that define application identification and processing by DPI. Likewise, in various exemplary embodiments, the application ID field 230 includes multiple application IDs that correspond to, for example, multiple applications, multiple subsets of a single application, or a combination thereof. It should also be apparent that, in various exemplary embodiments, the information in the application ID field 230 is encoded according to any format other than TLV currently known, or later developed.

FIG. 4 is a fragmented schematic diagram of an exemplary application mapping table 400 for use with a system and method for an application specific service ping packet. The mapping table 400 includes two columns. The first column is labeled application ID. The second column is labeled application name.

As depicted application mapping table 400 contains three lines of data. The first line has an application ID 1. The second line has an application ID 2. The third line has an application ID 3. It should be apparent that the application IDs depicted are overly simple. Thus, it should be equally apparent that any arbitrary value or character string can be used to correspond to an application in the application ID column.

In application mapping table 400, the fields for the application names are left blank. However, it should be apparent than an actual implementation of the mapping table 400 would include names in the application name column corresponding to each of the corresponding application IDs in each row of table 400 that a DPI element can process.

Application mapping table 400 is fragmented to represent that any number of application IDs may be included in the application mapping table 400. The use of application mapping table 400 will be described in greater detail below in connection with FIG. 5.

In various exemplary embodiments, the application is determined from an inspection of L3 to L7, user content traffic, and any related customization. In various exemplary embodiments, the L3-L7 ID consists of ID protocol on any subset of L3-L7 (i.e. any combination may be used).

In various exemplary embodiments, the application ID is determined based on schemes that are predefined. This allows mapping of the application ID and the other fields in the packet. Accordingly, in various exemplary embodiments, the DPI, such as DPI A and DPI B, is equipped with the application mapping table 400.

Figure 5:
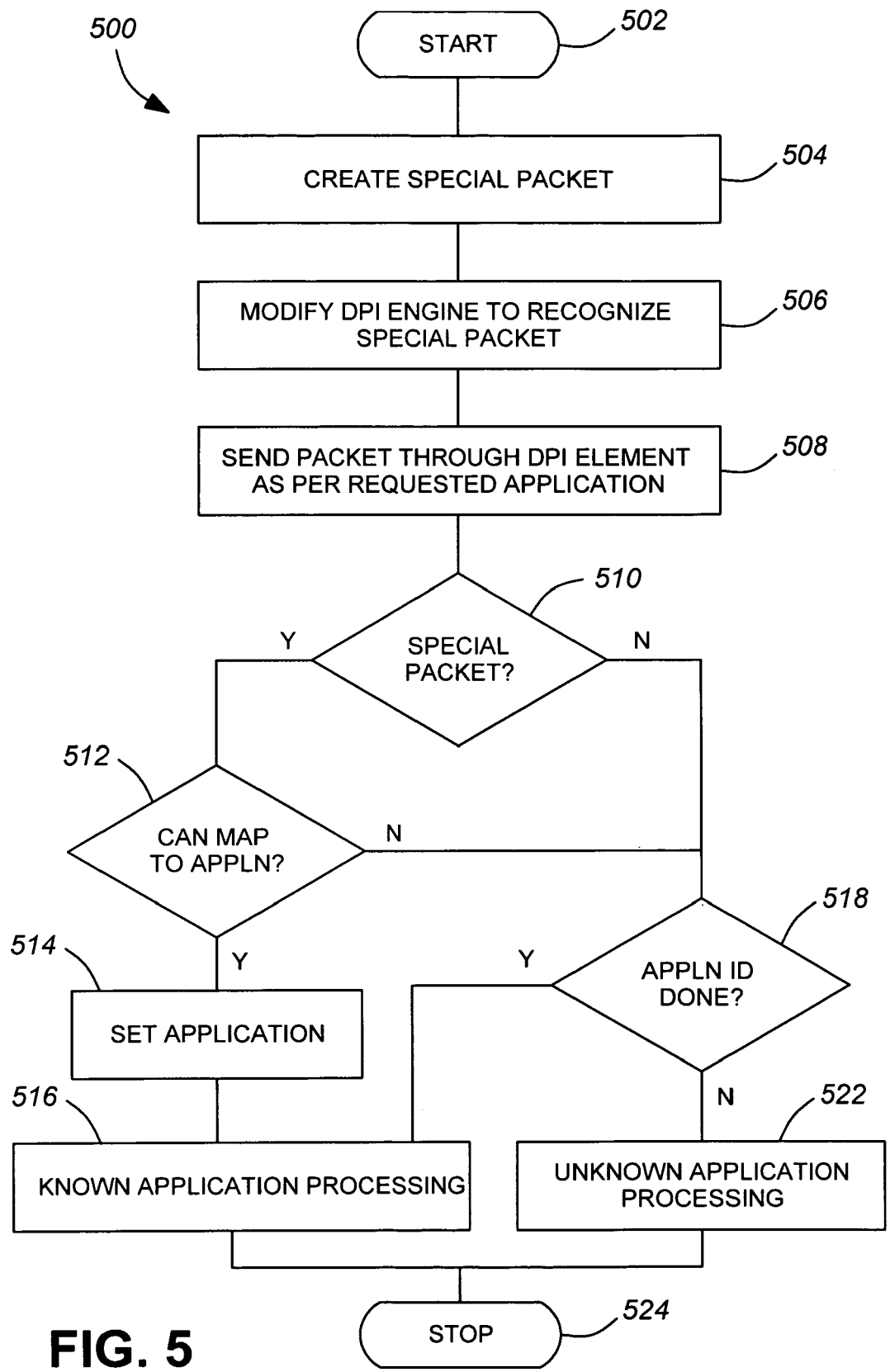
FIG. 5 is a flowchart of an exemplary method for an application specific service ping packet.

FIG. 5 is a flowchart of an exemplary method 500 for an application specific service ping packet 200. The method 500 starts in step 502 and continues to step 504.

In step 504, a special packet is created. In various exemplary embodiments, the special packet created in step 504 corresponds to application specific service ping packet 200. Following step 504, the method 500 proceeds to step 506. In step 506, the DPI engine is modified to recognize the special packet created in step 504. Following step 506, the method proceeds to step 508.

In step 508, the application specific service ping packet 200 is sent through the DPI element such as DPI A or DPI B as per the requested application. Thus, step 508 includes injecting the application specific service ping packet 200.

Following step 508, the method 500 proceeds to step 510. In step 510, a determination is made whether the packet 200 is a special packet. When a determination is made in step 510 that the packet is not a special packet, the method 500 proceeds to step 518 representing normal (i.e. not special-packet) DPI processing. Conversely, when a determination is made in step 510 that the packet is a special packet such as the application specific service ping packet 200, then the method 500 proceeds to step 512.

In step 512, a determination is made whether the special packet identified in step 510 can be mapped to an application. Thus, for example, a lookup in exemplary application mapping table 400 is performed in step 512.

When a determination is made in step 512 that the special packet identified in step 510 cannot be mapped to an application, then the method 500 proceeds to step 518. Conversely, when a determination is made in step 512 that the special packet identified in step 510 can be mapped to an application, the method 500 proceeds to step 514.

In step 514, the application is set. Thus, in various exemplary embodiments, the application is set in step 514 to an application listed in the application name column of application mapping table 400 based on a successful search for a line corresponding to the application in the application mapping table 400.

Following step 514, the method 500 proceeds to step 516. In step 516 application processing commences for the known application.

In step 518, a determination is made whether the application ID is done. When a determination is made in step 518 that the application ID is done, the method 500 proceeds to step 516 for known application processing as described above. Conversely, when a determination is made is step 518 that the application ID is not done, the method 500 proceeds to step 522.

In step 522, unknown application processing is performed. In various exemplary embodiments, the unknown application processing performed in step 522 corresponds to a regular or default application processing. In other exemplary embodiments, the unknown application processing performed in step 522 includes dropping the application.

Accordingly, upon receiving a packet identified as this type of special packet, the DPI treats the packet as if it belonged to a previously specified application. According to the foregoing, various exemplary embodiments put network element DPI into an application specific processing without first requiring an application awareness processing.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications can be affected while remaining within the spirit and scope of the invention. Accordingly, the foregoing disclosure, description, and figures are for illustrative purposes only and do not in any way limit the invention, which is defined only by the claims.

What is claimed is:

1. A method performed by a network node of using an application specific service ping packet, comprising:
receiving, at the network node, the application specific service ping packet including:
a special packet identification field that identifies the application specific service ping packet as a special packet, and
an application identification field that identifies an application to which the application specific service ping packet corresponds;
performing deep packet inspection on the application specific service ping packet using a deep packet inspection element of the network node;
identifying the application specific service ping packet as a special packet;
determining that the application specific service ping packet is mapped to the application;
identifying the application;
setting a flow represented by the application specific service ping packet to the application; and
performing application processing based on the set application.

2. The method of using an application specific service ping packet, according to claim 1, wherein the network node recognizes the application specific service packet by the presence of the special packet identification field.

3. The method of using an application specific service ping packet, according to claim 1, wherein performing deep packet inspection on the application specific service ping packet using a deep packet inspection element of the network node is performed according to a requested application.

4. The method of using an application specific service ping packet, according to claim 1, wherein identifying the application specific service ping packet as a special packet includes identifying the application specific service ping packet as an application specific identification packet.

5. The method of using an application specific service ping packet, according to claim 1, wherein determining that the application specific service ping packet is mapped to the specific application includes matching the application identification field of the application specific service ping packet to an entry in an application mapping table.

6. The method of using an application specific service ping packet, according to claim 5, wherein the application mapping table is contained in the deep packet inspection element.

7. The method of using an application specific service ping packet, according to claim 1, wherein the specific application is identified from a single application specific service ping packet.

8. The method of using an application specific service ping packet, according to claim 1, wherein a VCCV-PING standard is extended.

9. The method of using an application specific service ping packet, according to claim 8, wherein the deep packet inspection engine is put into application processing for the specific application.

10. The method of using an application specific service ping packet, according to claim 1, wherein the application identification field includes a type field.

11. The method of using an application specific service ping packet, according to claim 1, wherein the application identification field includes a length field.

12. The method of using an application specific service ping packet, according to claim 1, wherein the application identification field includes a value field.

13. The method of using an application specific service ping packet, according to claim 12, wherein the value field includes an application code point.

14. The method of using an application specific service ping packet, according to claim 12, wherein the value field includes an application data point.

15. The method of using an application specific service ping packet, according to claim 1, wherein the specific application is identified from an inspection of any combination of L2 to L7.

16. A method performed by a network node of using an application specific service ping packet, comprising:
 receiving, at the network node, the application specific service ping packet including an application identification field that identifies an application to which the application specific service ping packet corresponds;
 performing deep packet inspection on the application specific service ping packet using a deep packet inspection element of the network node;
 identifying the application specific service ping packet as a special packet;
 determining that the application specific service ping packet is mapped to a specific application;
 identifying the specific application;
 performing application processing based on the set specific application.

* * * * *